US006786699B2

(12) United States Patent
Shapiro et al.

(10) Patent No.: US 6,786,699 B2
(45) Date of Patent: Sep. 7, 2004

(54) METHODS OF ASSEMBLING AIRFOILS TO TURBINE COMPONENTS AND ASSEMBLIES THEREOF

(75) Inventors: David Elliott Shapiro, Niskayuna, NY (US); Steven Kerry Williams, Brewer, ME (US); Charles Byron Adams, Olamon, ME (US); Gregory Norman Fournier, Hermon, ME (US); Gregory Lee Landry, Glenburn, ME (US); Maurice David Fournier, Hermon, ME (US)

(73) Assignee: General Electric Company, Schenectady, NY (US)

( * ) Notice: Subject to any disclaimer, the term of this patent is extended or adjusted under 35 U.S.C. 154(b) by 56 days.

(21) Appl. No.: 10/179,019

(22) Filed: Jun. 26, 2002

(65) Prior Publication Data

US 2004/0001757 A1 Jan. 1, 2004

(51) Int. Cl.$^7$ ................................. F01D 5/32
(52) U.S. Cl. ................... 416/216; 416/218; 29/889.21; 29/889.22
(58) Field of Search ................... 415/1, 209.3, 208.2; 416/215, 218, 216; 29/889.21, 889.22

(56) References Cited

U.S. PATENT DOCUMENTS 1,606,029 A * 11/1926 Herr .......................... 416/216
2,225,769 A * 12/1940 Conrad ....................... 416/216

* cited by examiner

Primary Examiner—Edward K. Look
Assistant Examiner—Dwayne White
(74) Attorney, Agent, or Firm—Nixon & Vanderhye P.C.

(57) ABSTRACT

Airfoils and grooves on the rotor or carrier for the airfoils have generally complementary dovetail shapes. The airfoils are installed in the grooves by sliding the bases of the airfoils along the circumferential grooves into final circumferential positions. At each circumferential position, a pin is driven between the base of the airfoil and the bottom of the groove to displace the airfoil radially into a final radially secured position taking up the clearance necessary to enable sliding movement of the airfoils about the groove. A first tool is used to drive each pin in a generally tangential direction by hammering on the end of the tool, transmitting an axial force to the pin. When the circumferential clearance of the last installed airfoil is insufficient to permit further use of a tangentially oriented tool to install additional airfoils, a second tool having an angled head is disposed into the groove to engage the pin. By hammering on the second tool, a component of the applied force drives the pins between the airfoil bases and the bottom of the groove to finally secure the remaining airfoils in a fixed radial position.

2 Claims, 8 Drawing Sheets

US 6,786,699 B2

METHODS OF ASSEMBLING AIRFOILS TO TURBINE COMPONENTS AND ASSEMBLIES THEREOF

BACKGROUND OF THE INVENTION

The present invention relates to methods for assembling airfoils onto rotors and carriers therefor forming parts of a turbine and assemblies thereof and particularly relates to methods for securing buckets and nozzles in final fixed radial positions relative to the rotor and stationary carrier and assemblies thereof.

As well known in turbine technology, for example, steam turbines, a plurality of airfoils are arranged in an annular array about a wheel or rotor rim. Additionally, a plurality of airfoils, e.g., stator blades, are also arranged in an annular array about a fixed carrier forming part of a housing surrounding the rotor. The airfoils of the rotor and carrier form multiple axially spaced stages through which a dynamic fluid, e.g., steam, passes to drive the rotor. Typically, each airfoil has a generally dovetail-shaped base or shank which is received in a complementary-shaped groove in the associated component part. For example, the base of a bucket has a pair of axially extending flanges defining recesses along axially opposite sides of the base for disposition in a complementary-shaped groove on the rotor. Thus, the rotor groove has flanges receivable within the bucket recesses and recesses for receiving the flanges of the bucket base. Correspondingly, the airfoils forming the stator blades have bases with axially extending recesses and flanges which are complementary in shape to axially extending flanges and recesses of the carrier so that the bases of the stator airfoils can be disposed in the groove of the carrier.

To install the buckets along the rim of the rotor, a radial entry slot is formed in the rotor. The bases of the airfoils are passed through the entry slot and then advanced circumferentially along the groove, stacking the airfoil bases one against the other. For each fixed carrier (which is split into a top half and a bottom half), the airfoils are inserted at the horizontal split line of each half and slide in a circumferential direction along the groove in the carrier to stack the bases thereof one against the other. In order to slide the airfoils in a circumferential direction, however, radial clearance between the bases of the airfoils and the slots is required. It will be appreciated that because of the necessary radial clearance, the airfoils are also required to be fixed in a radial direction, as well as circumferential direction, in final position. Accordingly, there is a need for apparatus and methods for fixing the airfoils in a final radial position about the rotor or carrier.

BRIEF DESCRIPTION OF THE INVENTION

In accordance with a preferred embodiment of the present invention, there is provided methods for facilitating final securement of the airfoils in fixed radial positions relative to the rotor and the carrier and assemblies thereof. The assembly includes a configuration of the grooves in the rotor and carrier, configurations of the bases of the airfoils generally complementary to the grooves and a plurality of pins. Two different tools for use during installation of the airfoils on the rotor and carrier are also provided as part of a method of assembly. Particularly, a circumferentially extending groove having a generally dovetail shape in a circumferential direction and comprising part of a rotor rim or a stationary carrier is provided. Additionally, a plurality of airfoils each having a base generally complementary in shape to the dovetail-shaped groove is provided. Thus, the bases of the airfoils are slidable in a circumferential direction along the grooves with a radial clearance whereby the bases of the airfoils may be stacked in an arcuate array thereof against one another upon installation in the groove. To finally position the airfoils relative to the groove and prevent radial movement, a retaining element is disposed between the bottom of the groove and the bottom of the base of each airfoil to displace and retain the airfoil in a generally radial direction into a final fixed radial position relative to the groove. Particularly, a recess is formed in the bottom of a rotor or carrier groove and a pin comprising the retaining element is driven by unique tools into the recess. The pin is generally cylindrical and has a flat along a side thereof. With the pin in the recess, the flat projects from the recess beyond the base of the groove and, when driven into engagement between the base of the airfoil and the bottom of the groove, the airfoil is located in its final fixed radial position.

One of the tools has a straight handle and a tool head terminating in an end generally corresponding to the shape of the pin. By driving a pin in a circumferential direction into the recess in the bottom of a groove between each airfoil base and the groove bottom, the pin fixes the airfoil into its radial final position. When the majority of the airfoils are stacked against one another in the groove, there is limited clearance for this first tool to drive the pin in a generally tangential direction into the groove to complete the installation of the remaining airfoils. Consequently, for the remaining airfoils, a second tool having an angled tool head and a tip corresponding to the shape of the pin end is provided. By inserting the second tool head into the groove with the back side of the tool head engaging along the recess in the groove bottom, a hammering action on the tool handle provides sufficient lateral force to drive the pin between the recess of the groove and the base of the airfoil forcing the airfoil into final position.

In a preferred embodiment according to the present invention there is provided in a turbine having an arcuate groove forming a generally dovetail shape in a circumferential direction forming part of a rotatable rotor rim or a stationary carrier and a plurality of airfoils each having a base generally complementary in shape to the dovetail-shaped groove and wherein the airfoil bases are slidable circumferentially along the groove with a radial clearance for stacking the airfoils in an arcuate array upon installation thereof in the groove, a method of finally radially positioning the airfoils relative to the groove, comprising the steps of (a) displacing an airfoil by sliding the airfoil base along the groove to a substantially final circumferential location within the groove and (b) inserting a retaining element between the bottom of the groove and a bottom of the base of the airfoil to displace the airfoil in a generally radial direction into a final radial position relative to the groove.

In a further preferred embodiment according to the present invention, there is provided a turbine comprising a turbine component having an arcuate generally dovetail-shaped groove extending in a circumferential direction, a plurality of airfoils each having a base generally complementary in shape to the shape of the dovetail-shaped groove, the dovetail-shaped groove and the dovetail-shaped airfoil bases having a radial clearance therebetween to enable displacement of the airfoil bases about the groove and an element disposed between the airfoil bases and a bottom of the groove to locate the airfoil in a fixed final radial position taking up the radial clearance between the airfoil bases and the groove.

BRIEF DESCRIPTION OF THE DRAWINGS

FIG. 11 is a cross-sectional view thereof taken generally about on lines 11—11 in FIG. 9;

DETAILED DESCRIPTION OF THE INVENTION

Figure 1:
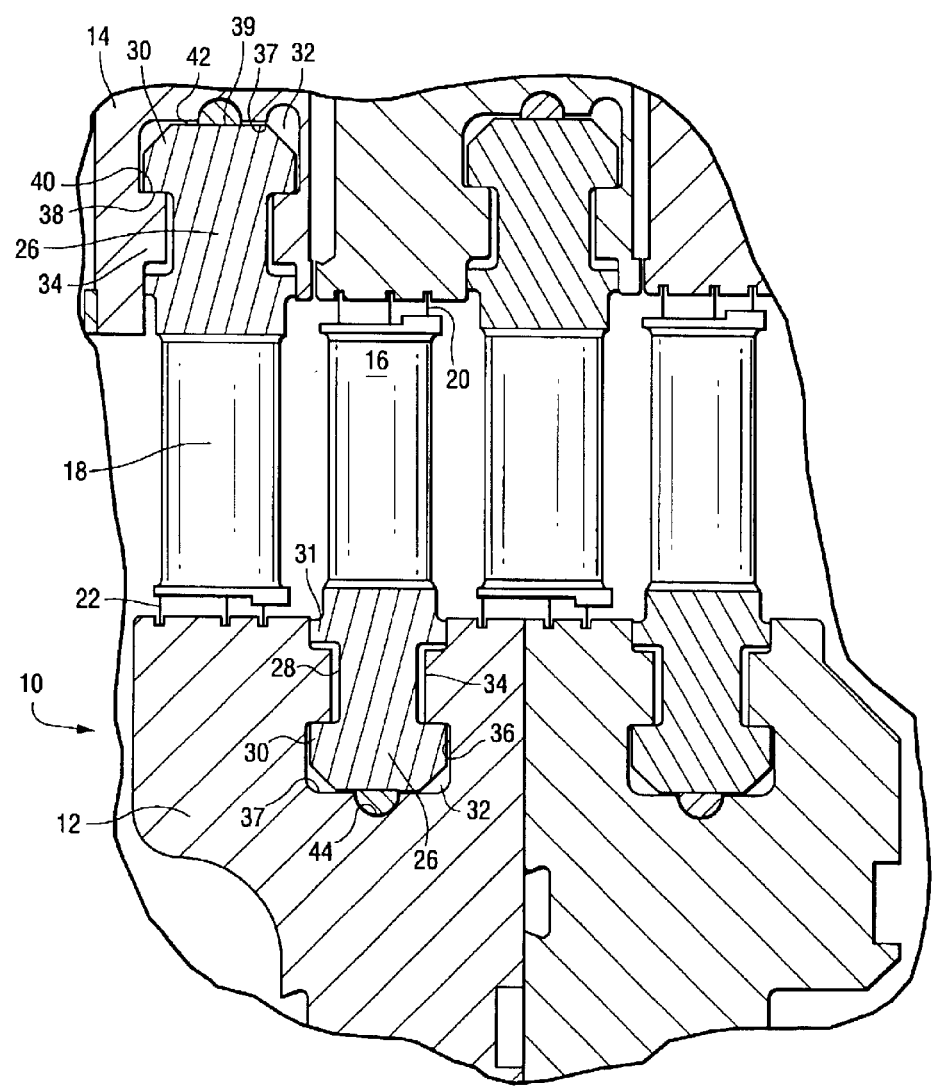
FIG. 1 is a fragmentary cross-sectional view illustrating the airfoils of a rotor and a carrier in final fixed radial positions in a turbine in accordance with a preferred embodiment of the present invention.

Referring now to the drawings, particularly to FIG. 1, there is illustrated a portion of a turbine, generally designated 10, comprised of a rotor 12 and a stationary carrier 14. As typical in turbines, the rotor 12 carries a plurality of airfoils, i.e., buckets 16 in axially spaced, circumferential arrays thereof, two arrays being illustrated. The stationary carrier 14 mounts a plurality of airfoils, i.e., nozzles 18, in axially spaced circumferential arrays thereof, two arrays being illustrated. The free ends of the airfoils forming the buckets 16 and nozzles 18 each have radially projecting labyrinth teeth 20 and 22, respectively, forming labyrinth seals with the radially opposed component part of the turbine.

Each of the airfoils 16 and 18, whether a nozzle or a bucket, has a commonly shaped base as well as a groove in which the base is received in the corresponding rotor 12 or carrier 14. A description of the base of one airfoil and the groove in which the base resides will therefore suffice as a description for the mounting of both the buckets and nozzles in the respective rotor and carrier. Referring to FIG. 1, each bucket 16 has a base 26 of a generally dovetail-shaped configuration and of limited circumferential extent. Base 26 includes a pair of recesses 28 opening axially on opposite sides of the base and defined in part by a pair of radially spaced flanges 30 and 31 projecting axially from opposite sides of base 26. The circular groove 32 into which the base 26 is received has a pair of flanges 34 which project axially toward one another for disposition in the recesses 28 of base 26. Groove 32 includes a pair of recesses 36 adjacent the bottom 37 of groove 32. Recesses 36 are in axial alignment with and receive the flanges 30 of the base 26.

In order to, install the airfoils within the rotor or carrier grooves, the rotor and carrier grooves are provided with entry slots, not shown. For the rotor, the entry slot opens radially for receiving the bases of the airfoils in an radial direction. Subsequent sliding movement in a circumferential direction along the groove enables the airfoils to be located in final circumferential positions about the rotor with their bases stacked against one another. For the grooves in the carrier, the horizontal split line enables disposition of the base 26 of each nozzle 18 into the groove and sliding movement of the base in a circumferential direction along the groove into a final location stacked against bases of adjacent nozzles. In either case, it will be appreciated that to slide the bases of the airfoils in a circumferential direction, radial clearances between the flanges 34 and the bottom 37 of the groove 32 on the one hand and the flanges 30 of the bases 26 of the airfoils must be provided. The total radial clearance necessary is illustrated in the upper left corner of FIG. 1 with respect to the nozzle base 26 illustrated in fixed location relative to the carrier groove 32. There the shoulder 38 on flange 30 butts a stop 40 on the carrier flange 34. The radial clearance space 42 between the bottom 37 of the groove 32 and the bottom 39 of the airfoil base 26 therefore represents the total radial clearance space necessary to permit the sliding movement of the bases of the airfoils along the grooves. As noted earlier, the present invention provides an installation method and tools to accomplish that method to finally fix the airfoil when in its prescribed circumferential location against radial movement.

To accomplish the foregoing, the bottom 37 of each groove 32 is provided with a concave recess 44 which extends in a circumferential direction the full arcuate extent of the groove. Preferably, however, the recess 44 extends the entire circumferential distance about the rotor groove, e.g., about each of the 180° halves of the carrier.

Figure 2:
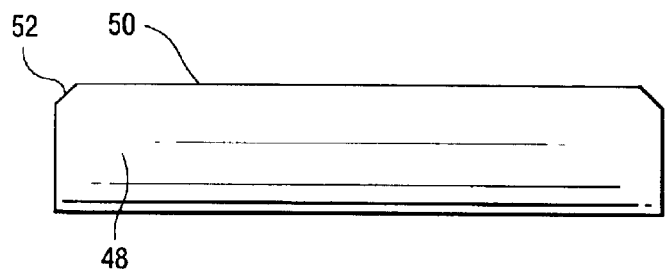
FIG. 2 is a side elevational view of a pin used to finally position the airfoil in the airfoil groove.
Figure 3:
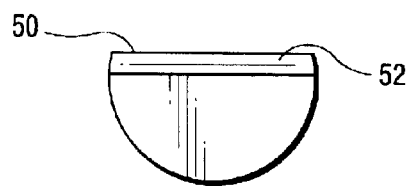
FIG. 3 is an end elevational view of the pin of FIG. 2.
Figure 4:
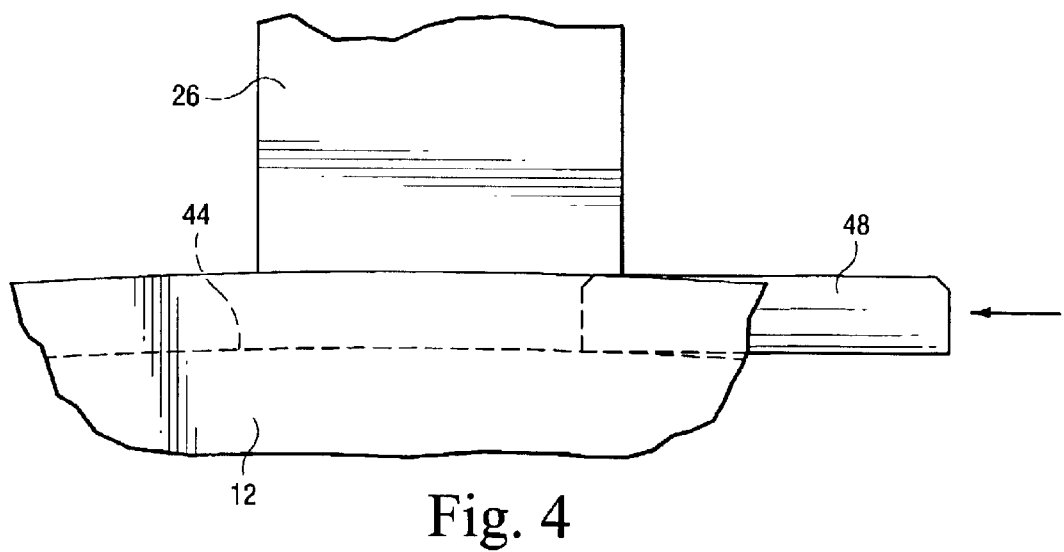
FIG. 4 is a schematic illustration of the insertion of a pin between the base of a groove and the base of an airfoil.

Referring to FIGS. 2 and 3, a plurality of pins 48 are provided. Each pin is generally cylindrical and elongated and has a flat 50 along one side of the pin. For reasons noted below, the end faces and the flat side 50 of each pin 48 are beveled at 52. The pin has a linear length generally corresponding to the same circumferential distance as the base 26 of each airfoil. The arcuate surface of the pin is preferably complementary to the arcuate surface of the grooves 34. When placed in the recess 44, the flat side 50 of the pin projects above the bottom 37 of the groove 32.

Figure 5:
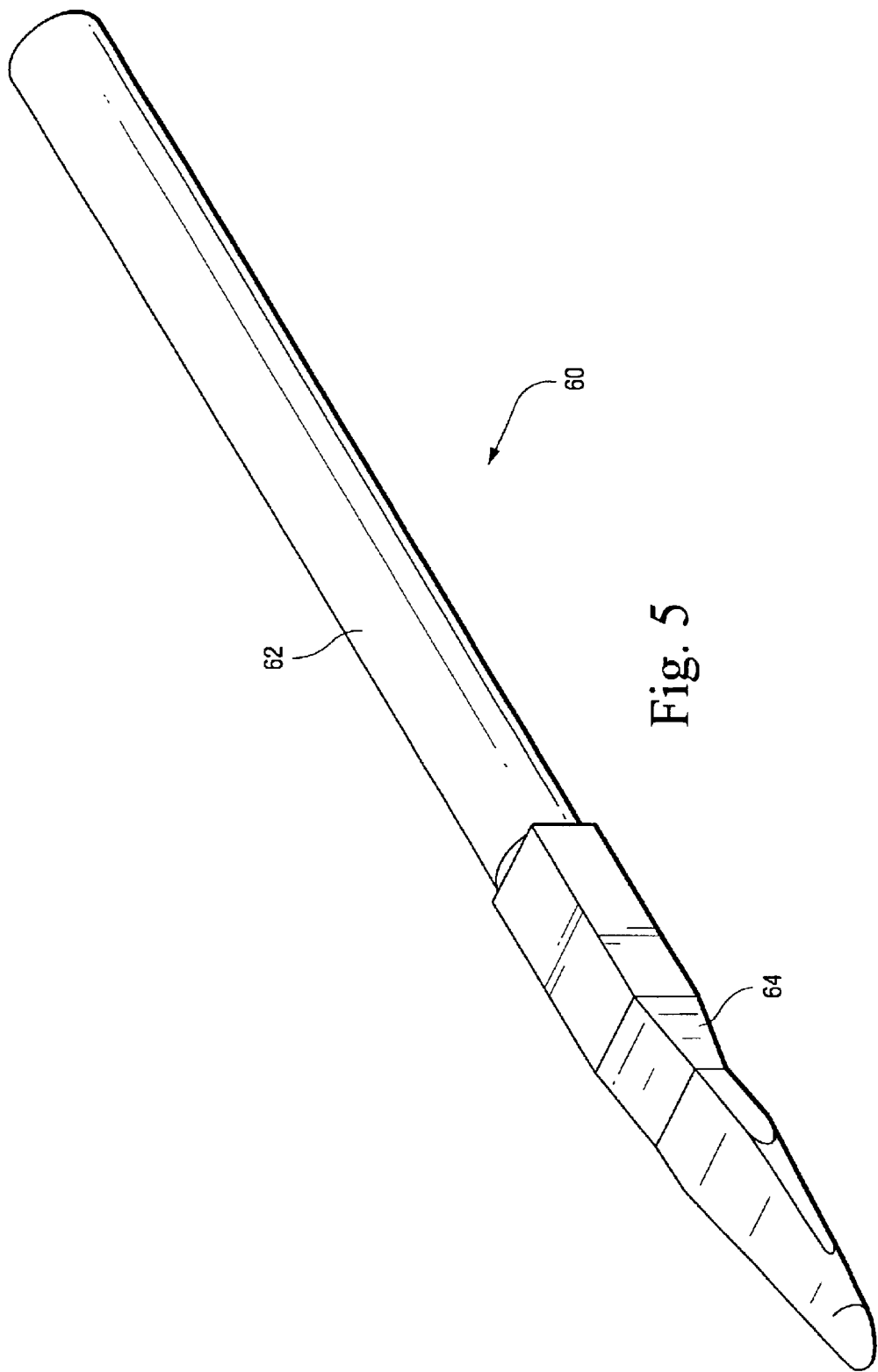
FIG. 5 is a perspective view of a straight tool for driving the pins during installation of a majority of the airfoils about the groove.
Figure 6:
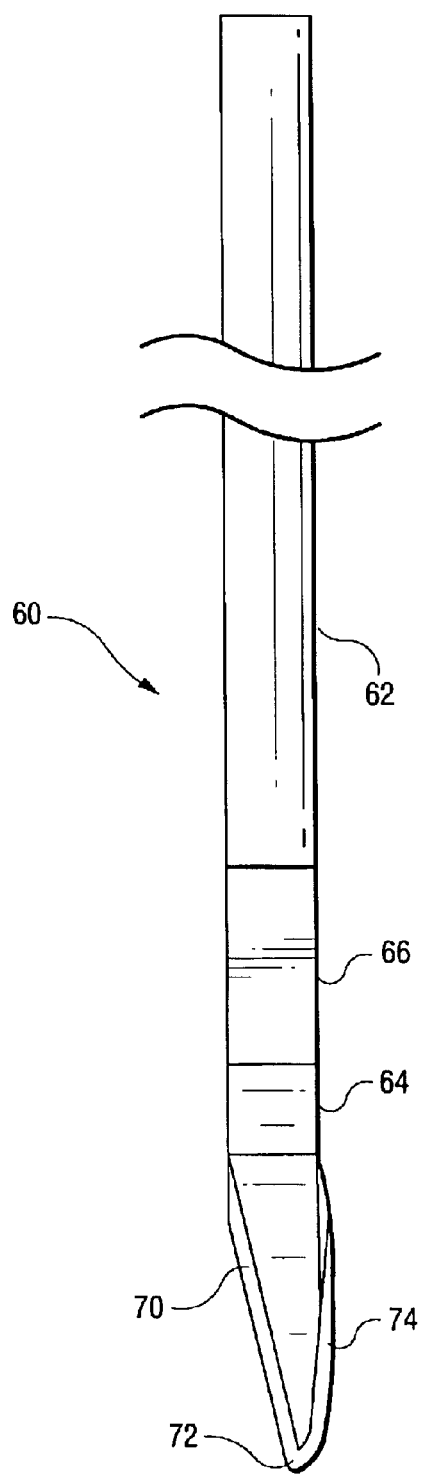
FIGS. 6 and 7 are side elevational views of the tool of FIG. 5.
Figure 7:
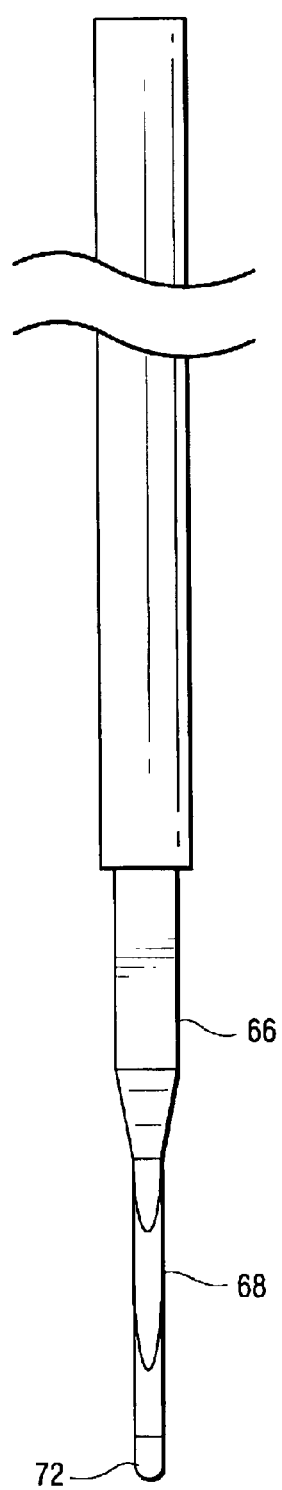
Figure 8:
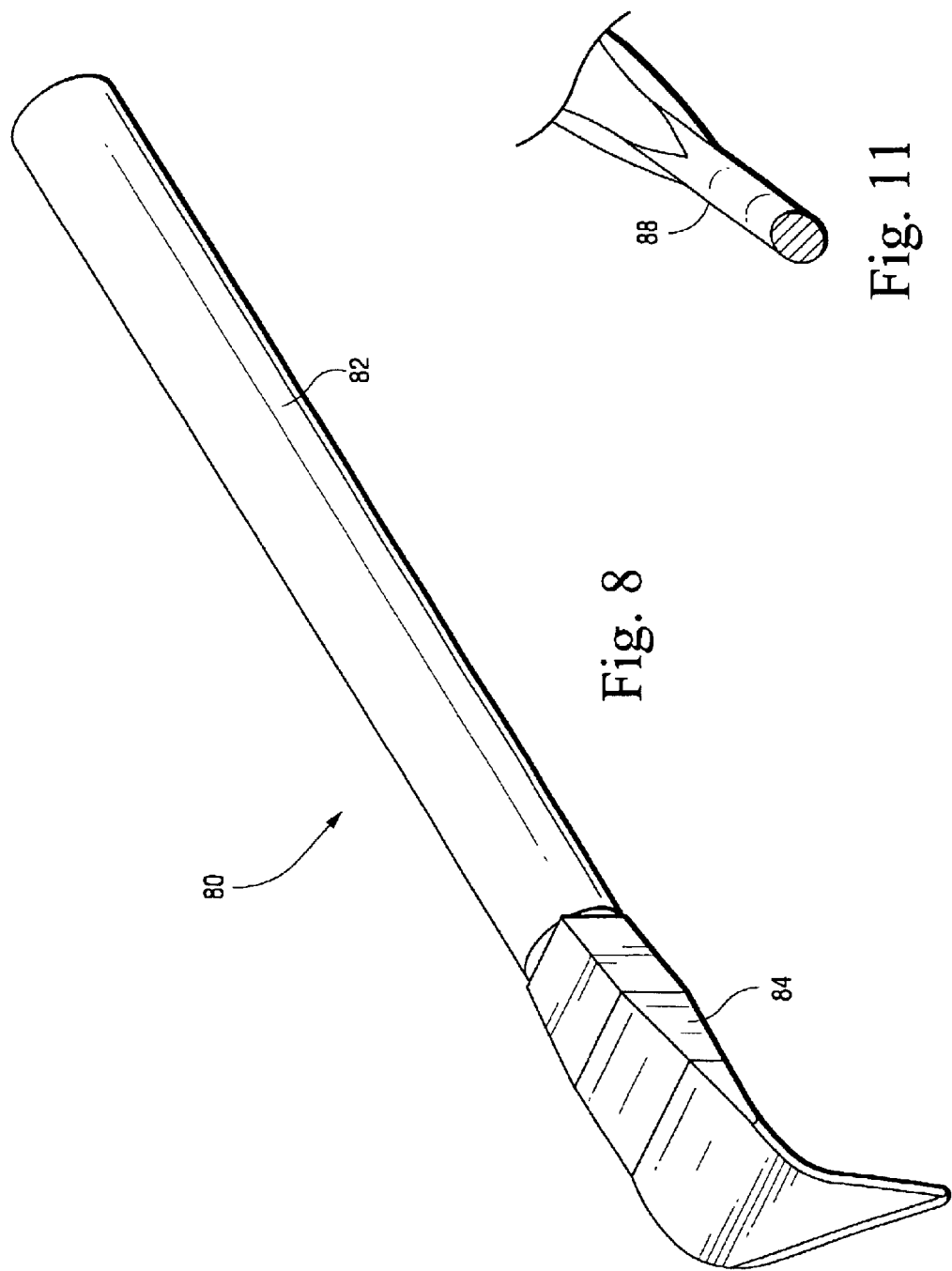
FIG. 8 is a perspective view of a second tool for driving the pins to finally install the remaining airfoils.
Figure 9:
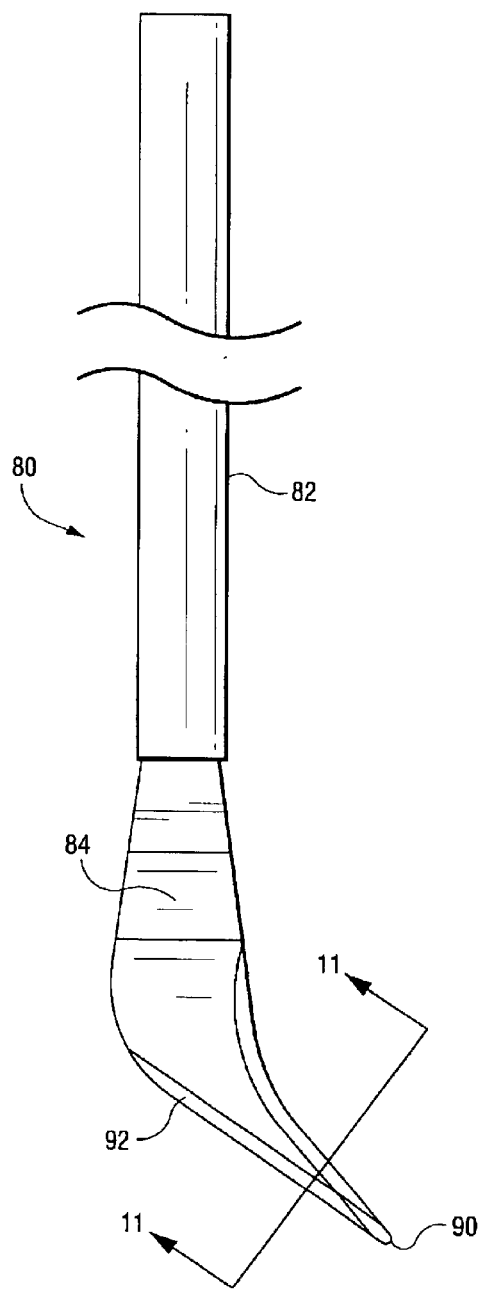
FIGS. 9 and 10 are side elevational views of the tool of FIG. 8.

Referring now to FIGS. 5, 6 and 7, there is illustrated a first tool, generally designated 60, for use in installing the majority of the airfoils in the grooves. Tool 60 includes an elongated handle or shank 62 formed of metal and a tool head 64, likewise formed of metal. The tool head 64 is shaped for insertion into the groove 32 and particularly to engage in the recess 44 to ensure engagement of the distal tip of the tool head 64 against an end of the pin 48. The tool head 64, as best illustrated in FIG. 7, includes stepped proximal and distal portions 66 and 68. The distal portion 68 includes an angled upper side 70 terminating in tip 72 and a lower side 74 which projects beyond the margin of the proximal portion 66. The angled portion 70, as well as the projecting portion 74, have convex edges. Projecting portion 74 is generally complementary in shape to the recess 44 such that portion 74 may be disposed in and slide along the recess 44 within groove 32.

Figure 10:
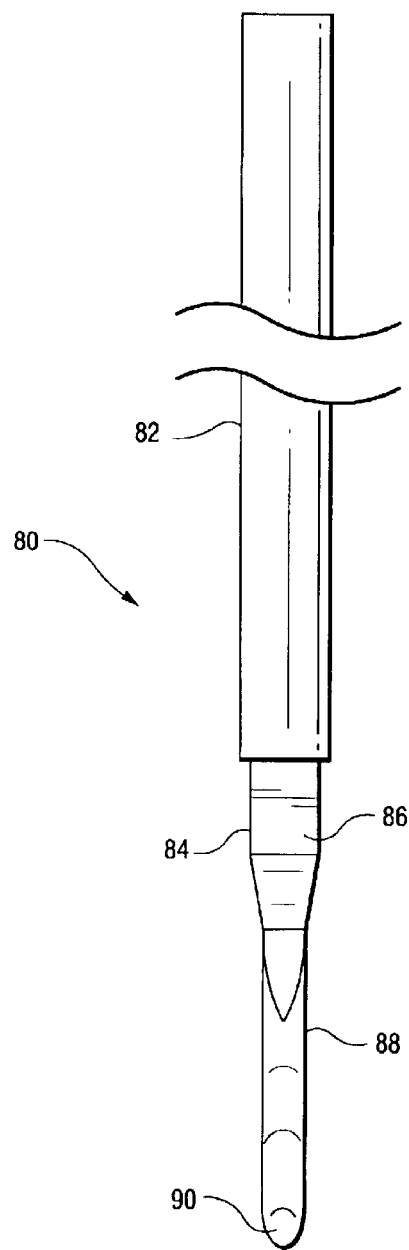

Referring now to FIGS. 8–11, there is illustrated a second tool, generally designated 80, having an elongated handle or shank 82 and a tool head 84. The tool is formed of metal and the tool head 84 is shaped to facilitate insertion of the pins 48 to secure the remaining airfoils in radial fixed positions. The tool head 84 includes stepped proximal and distal portions 86 and 88 (FIG. 10). The distal portion 88 is generally flat-sided and extends at an angle within a plane defined by its flat sides, terminating in a tip 90 for engagement with an end face of the pin 48. The bottom surface 92 of the head 84 is arcuate or rounded generally complementary to or smaller than the recess 44 in groove 32. It will be appreciated that in light of the angular extension of the distal portion 88 of the tool head 84, the handle 82 will extend substantially radially or at a relatively small angle off-radius when edge portion 92 is disposed in the recess 44 of groove 32.

To install the airfoils into either the groove 32 of the rotor 12 or the groove 32 of the carrier 14, similar procedures are employed and a description of the installation of one airfoil, either a bucket or nozzle, in the groove of the rotor or carrier as applicable will suffice as a description of the installation of all airfoils and where different, such differences are noted. The installation process assumes that a first airfoil has been located in the groove in a stop position. For example, in the case of a carrier comprised of two semi-circular halves, each extending approximately 180°, a first nozzle is installed in the groove against a stop at the end of the groove of the carrier half. Similarly, a first bucket (locking bucket) is disposed in the aforementioned radial entry slot along the rim of a rotor and fixed in position. These initial airfoils comprise the first airfoils against which the bases of other airfoils are stacked in a circumferential direction. For the rotor, the next airfoil and subsequent airfoils are disposed in a radial entry slot into the groove 32 and advanced in a circumferential direction toward and for stacking with the previously installed airfoil.

Upon displacement of an airfoil along the circumferential groove and engagement of its base against the base of a stop airfoil, a pin 48 is disposed in the recess 44 in alignment with the portion of the recess 44 between the base of the airfoil and the bottom 37 of the groove 32. The tip of the tool 60 is then engaged against the end of the pin away from the airfoil. With the tool in substantial axial alignment with the pin, a hammer, not shown, is applied to the end of tool 60 opposite its distal tip 72 to drive the pin into the recess 44 between the base of the airfoil and the bottom 37 of the groove 32. Because the pin 48 is formed of brass, the material of the pin will deform slightly as the pin is driven between the airfoil and the bottom of the groove. By driving the pin into the bottom of the recess 44 between the airfoil base and groove bottom 37, the airfoil is displaced radially outwardly of groove 32 to engage the flanges 30 of the airfoil base against the flanges 34 of the groove to limit radial outward movement from the groove. With the pin between the airfoil and the bottom of the groove, it will be appreciated that the airfoil is now in fixed radial position with the space 42 between the bottom 39 of the airfoil base 26 and the bottom 37 of the groove 32 constituting the total clearance space previously necessary to enable sliding movement of the airfoils bout the groove 32. The next airfoil is then displaced along the circumferentially extending groove and a similar pin is inserted between the airfoil and bottom of the groove using the tool 60 to drive the pin into the recess. This next airfoil is then circumferentially and radially located upon placement of the pin between the airfoil and the bottom of the groove using tool 60. The process continues with the displacement of the airfoil bases along the grooves for stacking against the previously installed airfoils and inserting the pin between the bases of the airfoil and the bottom of the groove using tool 60.

Figure 12:
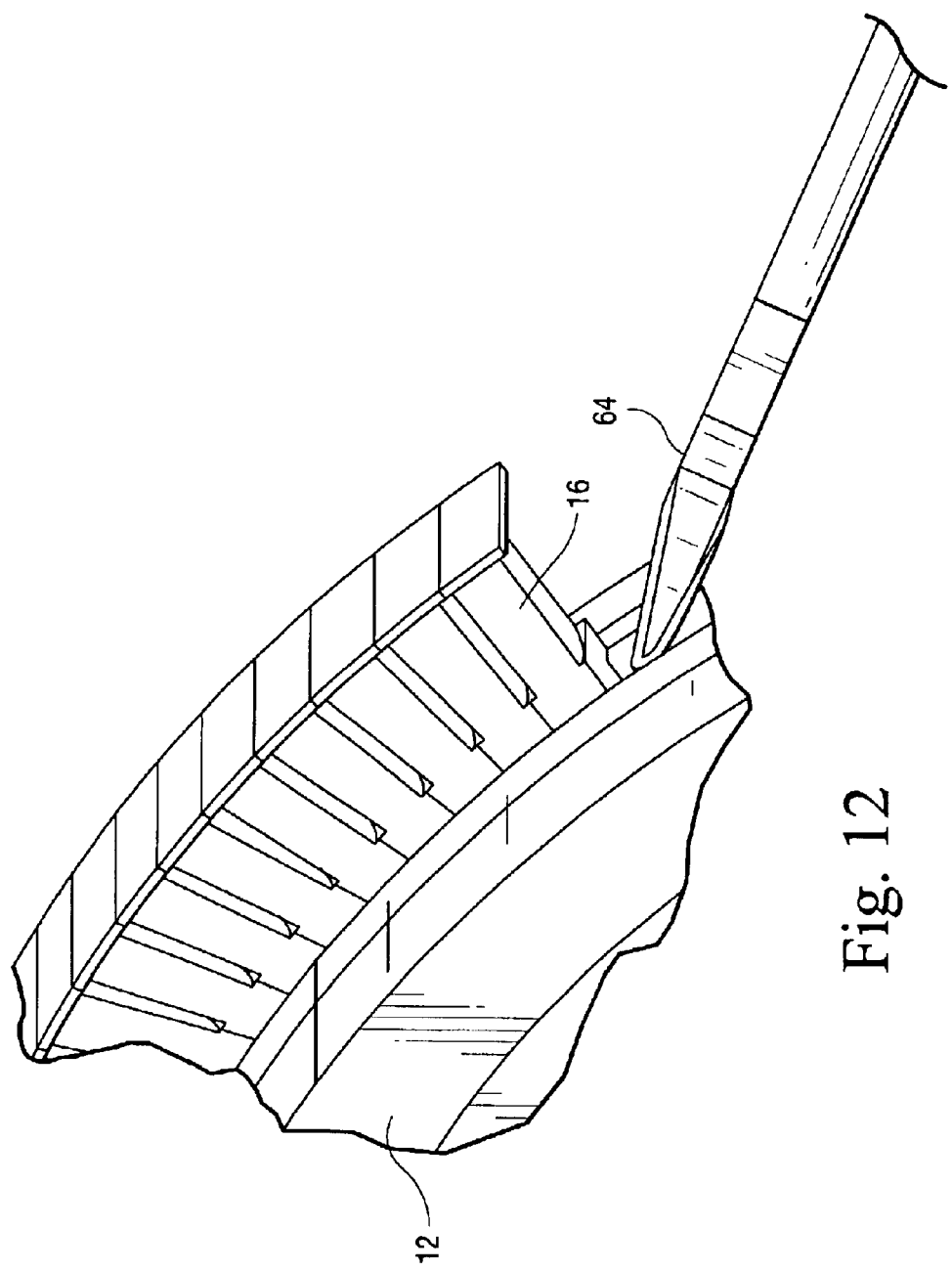
FIG. 12 is a fragmentary perspective view illustrating use of the tool of FIGS. 5–7.
Figure 13:
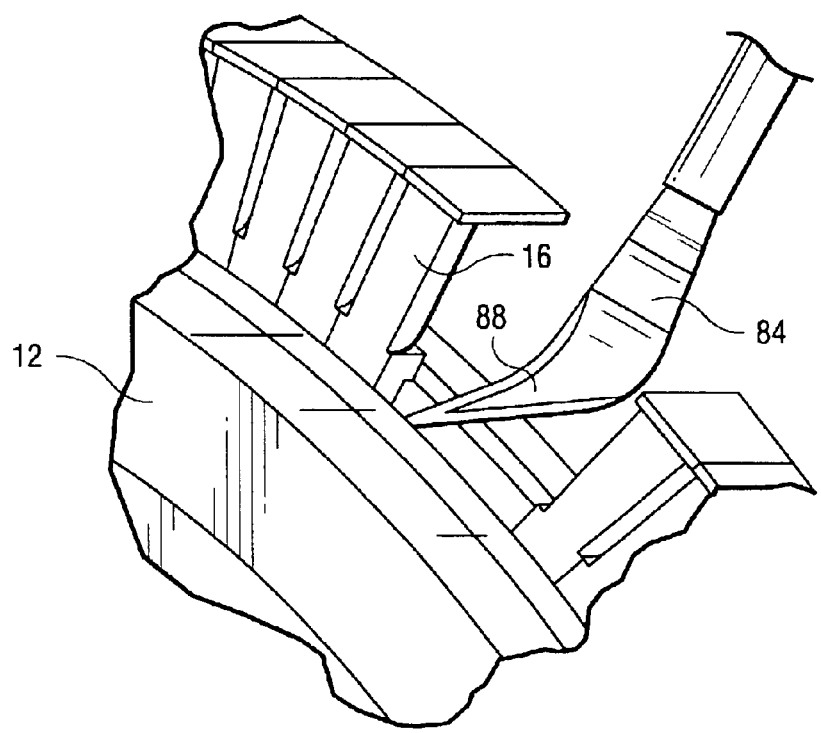
FIG. 13 is a view similar to FIG. 12 illustrating use of the second tool to finally radially position the remaining airfoils.

As the installation procedure progresses, the last few installed airfoils and the first installed airfoil lie sufficiently circumferentially close to one another as to inhibit use of the elongated tool 60 to drive the pins of the remaining airfoils to be installed. It will be appreciated from a review of FIG. 12 that the tool 60 extends generally at a small angle relative to a tangent to the groove and thus occupies during use a spacer equal to several of the next airfoils to be applied and fixed within groove 32. At this stage of the installation procedure when there is insufficient room to deploy tool 60, the second tool 80 is utilized to drive the remaining pins 48 to install the remaining airfoils. Thus, the angled outer face 92 of the second tool 80 is disposed in the groove 32 with its edge 92 disposed in recess 44. The distal tip 90 is engaged against the end face of a pin. By hammering on the opposite end of tool 80, a component of the hammering force will drive the pin between the base 26 and the bottom 37 of the groove similarly as in the installation of the preceding airfoils. As the carrier or rotor is filled with the airfoils, the second tool 80 is used to drive the final pins home. It will also be appreciated that the second tool head can be angled to a greater extent with decreasing portions of edge 92 engaging in the recess 44 until the final airfoil is installed in the groove 32.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a turbine having an arcuate groove forming a generally dovetail shape in a circumferential direction forming part of a rotatable rotor or a stationary carrier and a plurality of airfoils each having a base generally complementary in shape to said dovetail-shaped groove and wherein the airfoil bases are slidable circumferentially along the groove with a radial clearance for stacking the airfoils in an arcuate array upon installation thereof in said groove, a method of finally radially positioning the airfoils relative to the groove, comprising the steps of:

(a) displacing each airfoil by sliding the airfoil base along the groove to a substantially final circumferential location within the groove;

(b) forming a recess in one of said airfoil bases and a bottom of a groove;

(c) inserting generally cylindrical pins having a flat side along a length thereof into the recess with the flat sides of the pins facing toward another of the airfoil bases and the bottom of the groove; and d) applying a tool to an end of each pin and driving the tool in a generally radial directions along the recess between the bottom of the groove and the base of the airfoil.

2. In a turbine having an arcuate groove forming a generally dovetail shape in a circumferential direction forming part of a rotatable rotor or a stationary carrier and a plurality of airfoils each having a base generally complementary in shape to said dovetail-shaped groove and wherein the airfoil bases are slidable circumferentially along the groove with a radial clearance for stacking the airfoils in an arcuate array upon installation thereof in said groove, a method of finally radially positioning the airfoils relative to the groove, comprising the steps of:

(a) displacing an airfoil by sliding the airfoil base along the groove to a substantially final circumferential location within the groove;

(b) inserting a retaining element between the bottom of the groove and a bottom of the base of the airfoil to displace the airfoil in a generally radial direction into a final radial position relative to the groove;

(c) sliding bases of a plurality of airfoils along the groove to a substantially final circumferential location of the airfoils about the groove, subsequent to displacing each airfoil into said location and prior to displacing a next airfoil into a corresponding final location, driving the retaining element in a generally circumferential direction between the airfoil base and the bottom of the groove to locate the airfoil in a final radial position, upon locating a majority of the airfoils about the groove in final radial positions, sequentially sliding bases of remaining airfoils along the groove and driving a tool in a generally off-radial direction to drive the retaining elements in a generally circumferential direction between the airfoil bases of the remaining airfoils and the bottom of the groove into final radial position until installation is complete; and (d) wherein the steps of driving the elements in generally circumferential and generally radial directions are performed by applying first and second tools, respectively, different from one another, said first tool including a straight punch having a first head and a second tool having an angled second head, and including the steps of engaging said first head against said element and driving the first tool and element engaged thereby in a generally circumferential direction by hammering on an opposite end of the first tool from the first head, and engaging the angled end of the second tool in the recess and driving the second tool in a generally radial direction by hammering on an opposite end of the second tool from said second head to drive the element in a circumferential direction.

* * * * *